US011775526B1

(12) United States Patent
Townsend et al.

(10) Patent No.: US 11,775,526 B1
(45) Date of Patent: *Oct. 3, 2023

(54) SYSTEMS AND METHODS FOR JOINING NON-RELATIONAL DATABASE SEARCH RESULTS OVER MULTIPLE DATABASE INDEXES

(71) Applicant: United Services Automobile Association (USAA), San Antonio, TX (US)

(72) Inventors: John Stephen Townsend, San Antonio, TX (US); Nicholas Paul Metzger, San Antonio, TX (US); Paul Barrera, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,033

(22) Filed: Aug. 17, 2022

Related U.S. Application Data

(63) Continuation of application No. 16/697,768, filed on Nov. 27, 2019, now Pat. No. 11,449,511.

(51) Int. Cl.
*G06F 16/2455* (2019.01)
*G06F 16/901* (2019.01)
*G06F 16/904* (2019.01)

(52) U.S. Cl.
CPC ........ *G06F 16/2456* (2019.01); *G06F 16/901* (2019.01); *G06F 16/904* (2019.01)

(58) Field of Classification Search
CPC ... G06F 16/2456; G06F 16/901; G06F 16/904
See application file for complete search history.

(56) References Cited

U.S. PATENT DOCUMENTS

| 10,984,044 | B1 | 4/2021 | Batsakis et al. |
| 2008/0104542 | A1 | 5/2008 | Cohen et al. |
| 2014/0156686 | A1 | 6/2014 | Woodings et al. |
| 2015/0220601 | A1 | 8/2015 | Leyba |
| 2016/0224660 | A1* | 8/2016 | Munk ................... G06F 16/316 |
| 2018/0157706 | A1 | 6/2018 | He et al. |
| 2018/0341672 | A1 | 11/2018 | Yamazaki |
| 2020/0004794 | A1* | 1/2020 | Pal ........................ G06F 16/951 |
| 2020/0042626 | A1 | 2/2020 | Curtis et al. |
| 2020/0218507 | A1 | 7/2020 | Nakagawa et al. |
| 2021/0004372 | A1* | 1/2021 | Nanavati ................ G06N 5/022 |

* cited by examiner

*Primary Examiner* — Cam Y T Truong
(74) *Attorney, Agent, or Firm* — Fletcher Yoder, PC

(57) ABSTRACT

The presently disclosed systems and methods receive a search request for information provided in a first field of a first index of a non-relational database cluster and a second field of a second index of the non-relational database cluster. A first database query is performed on the first index based on the first field, and the first database query results may be stored in volatile memory. A second database query is performed on the second index based on the second field, and the second database query results may be stored in the volatile memory. A joined dataset of the first database query results and the second database query results having a joined field corresponding to the first field and the second field is then be generated. The joined dataset is displayed in a user interface.

20 Claims, 5 Drawing Sheets

JOINED DATASET 126

| DATE SUBMITTED | JOINED FIELD 152 | REPORT SUMMARY 128 | INCIDENT TYPE 130 | DESCRIPTION 132 |
|---|---|---|---|---|
| 9/2/2018 | 102 | PHONES NOT WORKING | DEVICE | SCREEN FROZEN |
| 9/6/2018 | 103 | NETWORK DOWN | NETWORK | NETWORK SLOW |
| 9/22/2018 | 104 | MOUSE NOT WORKING | HARDWARE | SCROLL WHEEL STUCK |

FIG. 5

SYSTEMS AND METHODS FOR JOINING NON-RELATIONAL DATABASE SEARCH RESULTS OVER MULTIPLE DATABASE INDEXES

CROSS REFERENCE TO RELATED APPLICATIONS

This application is a continuation of U.S. Non-Provisional application Ser. No. 16/697,768, entitled "SYSTEMS AND METHODS FOR JOINING NON-RELATIONAL DATABASE SEARCH RESULTS OVER MULTIPLE DATABASE INDEXES," filed Nov. 27, 2019, which is hereby incorporated by reference it its entirety for all purposes.

BACKGROUND

The present disclosure relates generally to databases, and more particularly to joining search results from different non-relational database indexes.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Database search queries may be performed to acquire search results that provide desired information. However, in some instances, the desired information may reside on multiple indexes of a non-relational database cluster. That is, the database may not use a tabular format of rows and columns and instead use a storage model that may be configured for the specific requirements of the type of data being stored. Moreover, the desired information may correspond to distinct fields across the multiple database indexes, and the corresponding field in one database index may have a different field name than the corresponding field in another database index.

BRIEF DESCRIPTION OF THE DRAWINGS

Various aspects of this disclosure may be better understood upon reading the following detailed description and upon reference to the drawings in which:

FIG. 5 is an example joined dataset resulting from joining the non-relational database query results of FIG. 4, according to embodiments of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The presently disclosed systems and methods receive a search request for information provided in a first field of a first index of a database cluster and a second field of a second index of a database cluster. A first non-relational database query may be performed on the first database index based on the first field, and the first non-relational database query results may be stored in volatile memory. A second non-relational database query may be performed on the second database index based on the first field, and the second non-relational database query results may be stored in the volatile memory. Storing the first and second non-relational database query results in volatile memory may save memory resources in non-volatile memory, which may be beneficial in applications where non-volatile memory is a premium resource or where there is a surplus of volatile memory. A joined dataset of the first non-relational database query results and the second non-relational database query results having a joined field corresponding to the first field and the second field may then be generated and stored in non-volatile memory. The information may be displayed from the joined dataset.

Figure 1:
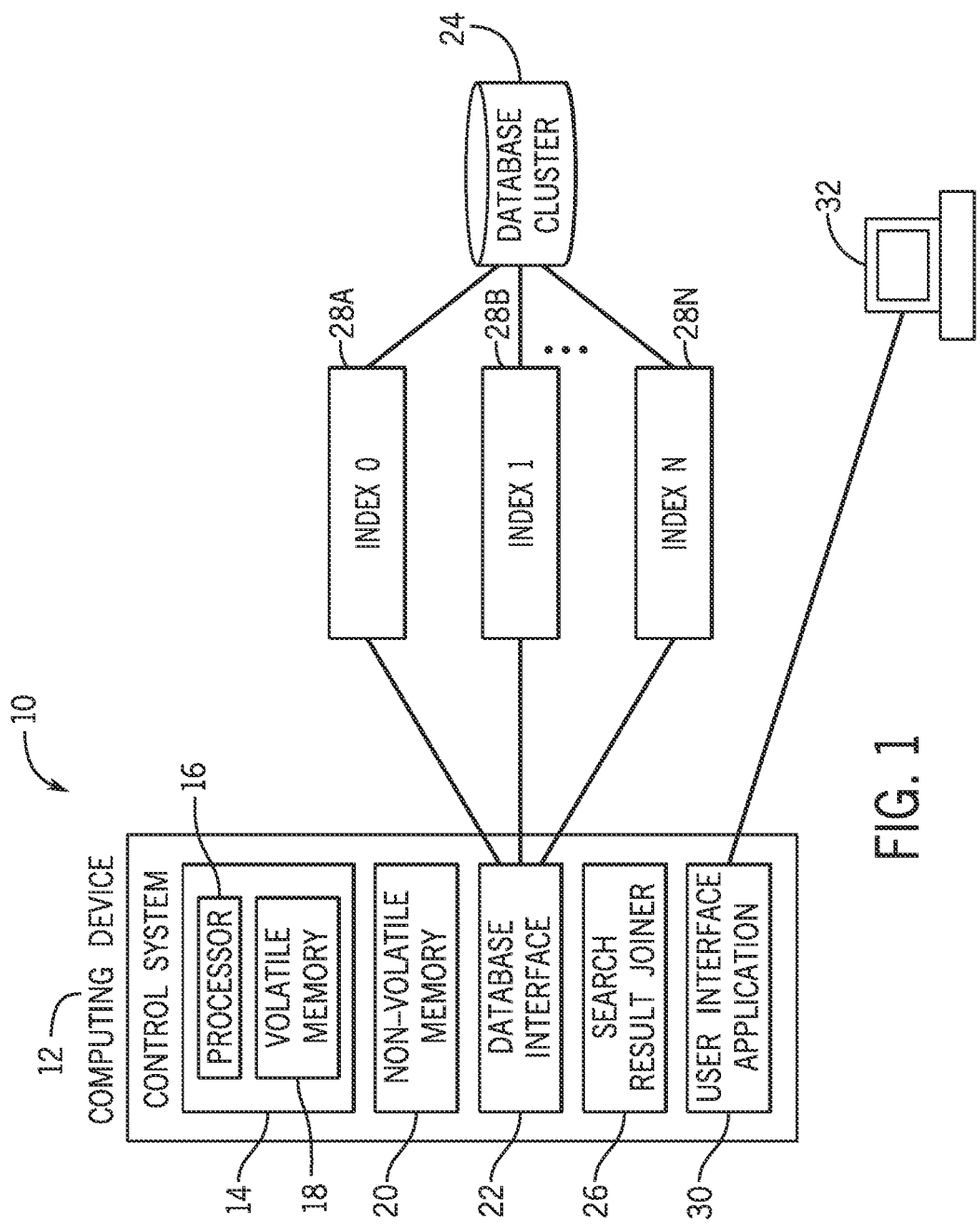
FIG. 1 is a block diagram of a database system that joins non-relational database query results across multiple database indexes, according to embodiments of the present disclosure.

With the foregoing in mind, FIG. 1 is a block diagram of a database system 10, according to embodiments of the present disclosure. As illustrated, the database system 10 includes a computing device 12, which may be in the form of any suitable electronic computing device, such as a server, computer, laptop, personal computer, mobile device, smartphone, tablet, wearable device, and so on. The computing device 12 may include a control system 14 that includes one or more processors (illustrated as processor 16) and one or more volatile memory devices (illustrated as volatile memory 18). The control system 14 may control and/or operate components of the computing device 12 by having the processor 16 (e.g., microprocessors) execute software programs and/or instructions stored in the volatile memory. For example, the processor 16 may execute instructions (e.g., computer code) stored in the volatile memory to facilitate querying databases and joining non-relational query results across multiple database indexes. Moreover, the one or more processors 16 may include multiple microprocessors, one or more "general-purpose" microprocessors, one or more special-purpose microprocessors, and/or one or more application specific integrated circuits (ASICS), or some combination thereof. For example, the processor 16 may include one or more reduced instruction set (RISC) processors.

The volatile memory 18 may store data when power is provided to the volatile memory 18, but cease storage of the data once power is no longer provided (e.g., when the computing device 12 is turned off). The volatile memory 18 may store information such as control software, look up tables, configuration data, etc. In some embodiments, the processor 16 and/or the volatile memory 18 may be external to the control system 14 and/or the computing device 12.

The volatile memory 18 may include a tangible, non-transitory, machine-readable-medium, such as a random access memory (RAM), including dynamic RAM (DRAM) and static RAM (SRAM).

The computing device 12 may also include one or more non-volatile memory devices (illustrated as non-volatile memory 20), such as a read-only memory (ROM), flash memory, ferroelectric RAM, a magnetic computer storage device (e.g., a hard disk drive, floppy disk, magnetic tape), or an optical disc. The non-volatile memory 20 may continue to store data even when power is no longer provided (e.g., when the computing device 12 is turned off), and generally has a larger storage capacity than the volatile memory 18. The volatile memory 18 and/or the non-volatile memory 20 may store a variety of information and may be used for various purposes. For example, the volatile memory 18 and/or the non-volatile memory 20 may store machine-readable and/or processor-executable instructions (e.g., firmware or software) for the processor 16 to execute, such as instructions for querying databases and joining non-relational query results across multiple database indexes.

The computing device 12 may also include a database interface 22 that may send queries to and receive query results from a database or database cluster 24. In some embodiments, the computing device 12 may be communicatively coupled to multiple databases or database clusters 24. In some cases, the computing device 12 may be communicatively coupled to the database cluster 24 via any suitable communication network or networks, including a mobile communication network, a Wi-Fi network, local area network (LAN), wide area network (WAN), and/or the Internet. The database interface 22 may include any suitable software or hardware components to enable it to query and receive query results from the database cluster 24. In some embodiments, the database interface 22 may be implemented as a virtual machine that emulates a computer system on the computing device 12 and implements specialized hardware and/or software to query and receive query results from the database cluster 24. For example, the database interface 22 may include a Java virtual machine (JVM) that enables the computing device 12 to run Java software applications, as well as software applications written in other computer languages that may be compiled by Java bytecode, to facilitate querying and receiving query results from the database cluster 24.

The database cluster 24 may include a non-relational database cluster (e.g., a non-Structured Query Language (NoSQL) database) that does not use a tabular format of rows and columns and instead uses a storage model that may be configured for the specific requirements of the type of data being stored. For example, the data may be stored as simple key/value pairs, as JavaScript Object Notation (JSON) documents, or as a graph consisting of edges and vertices. The database cluster 24 may also be distributed, open-sourced, and/or horizontally scalable. For example, the database system 10 may be based on or use the ElasticSearch platform, and the database cluster 24 may be an ElasticSearch cluster.

As an example, the database cluster 24 may enable a near real time search, such that there is a slight latency (e.g., approximately one second) from the time a document is indexed until the time the document becomes searchable. Each database cluster 24 may include one or more nodes (e.g., computing devices or servers) that stores data (also referred to as "documents") and provides indexing and search capabilities across all nodes. Each database cluster 24 may have a unique identifier, which may be used by a node to join the cluster 24. A node may include a server that is part of a database cluster 24 that stores data and participates in the cluster's indexing and search capabilities. The node may also include a unique identifier, e.g., that is assigned to the node at startup.

In some embodiments, the database interface 22 may access data in the database cluster 24 using database indexes 28A, 28B . . . 28N (collectively referred to as database indexes 28). A database index 28 may include a collection of documents that have somewhat similar characteristics. For example, a first database index 28A (e.g., "Database Cluster 0 Index 0") may correspond to customer data in a database cluster 24A (e.g., Database Cluster 0"), a second database index 28A (e.g., "Database Cluster 0 Index 1") may correspond to a product catalog in the database cluster 24A, and a third database index 28A (e.g., "Database Cluster 0 Index 2") may correspond to order data in the database cluster 24A. A database index 28 may be identified by a name that may be used to index, search, update, and delete operations against the data stored in the corresponding database cluster 24. Each database index 28 may include multiple types, which may be logical categories/partitions of a respective index 28 that enables storage/identification of different categories of documents in the respective index 28. For example, a first type of documents may be associated with users, while a second type of documents may be associated with blog posts. One or more database indexes 28 corresponding to a database cluster 24 may store field names of the database cluster 24.

A document may include a basic unit of information that may be indexed. For example, a first document may be associated with a customer (e.g., a single customer), a second document may be associated with a product (e.g., a single product), and a third document may be associated with an order (e.g., a single product). The document may be expressed in JSON (JavaScript Object Notation), which is a ubiquitous internet data interchange format. Within an index/type, any suitable number of documents may be stored. That is, a document may physically reside in a database index 28. The document may also be indexed/assigned to a type inside the index 28.

In some embodiments, a database index 28 may store an amount of data that exceeds the storage capacity of a node (e.g., a server). For example, a database index 28 may store a billion documents taking up 1 terabyte (TB) of disk space, which may not fit on a disk of a node, or the node storing the documents may be too slow to serve search requests. As such, in some cases, database index 28 may be divided into multiple portions or "shards". The number of shards in a database index 28 may be defined or predefined by default, by a user, or the like. Each shard may be a fully-functional and independent "index" (e.g., may serve as a database index 28 without additional implemented functionality) that may be hosted on any node in a database cluster 24. Shards may enable horizontally splitting/scaling of content volume in a database cluster 24, and/or distributing/parallelizing operations across shards (e.g., on multiple nodes), thus increasing performance/throughput. Distribution of shards and aggregation of documents into search requests may be managed by the database system 10, such that these processes may be transparent to the user.

As a failover mechanism in the event where a shard or node goes offline or disappears (e.g., due to a network/cloud environment failure), a database index's shards may be copied (as replica shards or "replicas"). Because the purpose of shard replication is to provide high availability in case a shard or node fails, a replica shard may be allocated on a different node than the original or "primary" shard that it was copied from. Advantageously, shard replication may enable scaling search volume/throughput, since searches may be executed on all replicas in parallel. The number of shards and replicas may be defined (e.g., per database index 28) at the time the index 28 is created. After the database index 28 is created, the number of replicas may be dynamically changed.

In alternative or additional embodiments, the database cluster 24 may include a tabular format of rows and columns. As such, references to a "database" or "database cluster" in the present disclosure may also refer to a table of any database. The database cluster 24 may also store any suitable type of data, such as data related to call centers, information technology providers, employee records, personal information, financial transactions, sales records, and so on.

However, in some instances, desired information to be sought via database queries may reside on more than one database index (e.g., 28A and 28B). Moreover, the desired information may correspond to a first field in database index 28A and a second field in database index 28B, where the field names of the first field and the second field may not be the same. For example, the database cluster 24 may store information related to information technology issues, and a user may seek all database records or information related to reported issues concerning networking. The database index 28A and the database index 28B may both include a category field that has a field value related to networking. However, the networking-related field in database index 28A may be named "issue type" while in database index 28B the field may be named "subject area". Similarly, the field value corresponding to networking may be different between the database indexes 28A, 28B. For example, in database index 28A, the field value may be "network" while, in database index 28B, the field value may be "wireless communication".

The computing device 12 may include a search result joiner 26 that joins multiple sets of search results from multiple search queries. The search result joiner 26 may be implemented as a software application (e.g., stored in the volatile memory 18 and/or the non-volatile memory 20), hardware (e.g., circuitry), or a combination of the two. In particular, to combine query or search results from multiple database indexes 28, the search result joiner 26 may join a first field in a first database index (e.g., 28A) and a second field in database index (e.g., 29B), even where the field names of the first field and the second field may not be the same, to generate a joined dataset having records made up of records from both the first database index 28A and the second database index 28B. As such, the search result joiner 26 may generate a new joined field from the first field of the first database index 28A and the second field of the second database index 28B. In some embodiments, the first field and the second field may not be the same data type (e.g., integer, Boolean, character, floating-point number, alphanumeric string, time, date, monetary value, or memory), and the search result joiner 26 may convert the first field, the second field, or both, to the same data type. The search result joiner 26 may generate the joined field having this data type to, for example, enable sorting of the joined dataset. That is, once the fields are joined, the processor 16 may sort the joined dataset by the joined field, as the joined field is made up of one data type (e.g., that may be sortable). While joining first and second fields in first and second database indexes 28A, 28B is shown as an example, it should be understood that any suitable number (e.g., between two and one million) of fields may be joined in any suitable number (e.g., between two and one million) of database index 28. For example, the search result joiner 26 may join five fields between eight database indexes 28 to generate a joined dataset.

Without having the search result joiner 26 joining the search results between multiple database indexes 28, a user might "manually" join the search results by entering database queries to each of the database indexes 28 to return the search results, and then enter one or more database commands to join the search results together into the joined dataset. However, such an action may cause the generated search results to be stored in the non-volatile memory 20. This may be undesirable in cases where the non-volatile memory 20 is a premium resource. Instead, the search result joiner 26 may store the search results in volatile memory 18 (e.g., of the control system 14), and store the joined dataset in the non-volatile memory 20, thus reducing or minimizing use of the non-volatile memory 20.

Moreover, updates to the joined dataset may use less overall memory resources when storing the joined dataset in the volatile memory 18. In particular, the volatile memory 18 generally has less storage capacity than non-volatile memory 20, and may operate to overwrite stored data with new data as a threshold storage amount has been reached. As such, the processor 16 may constantly store new data in the volatile memory 18 by rewriting previously stored data. In this case, when the processor 16 writes the joined dataset in the volatile memory 18, it may rewrite previously stored data. Indeed, in one embodiment, the processor 16 may determine that a previously generated joined dataset was stored in the volatile memory 18, and may overwrite the previously generated joined dataset with the newly generated joined dataset. When compared to storing the joined dataset on non-volatile memory 20, which may have a larger storage capacity and instead store the newly generated joined dataset in addition to previously generated joined datasets (and require a user to actively delete the previously generated joined dataset to reduce memory usage), using the volatile memory 18 to store the joined dataset may preserve memory resources and be more efficient.

The computing device 12 may also include a user interface application 30 that enables a user to enter database indexes 28 to join, and the fields to join them. In particular, the user interface application 30 may cause a user interface to be displayed on an electronic display of a user device 32. The user interface may include user interface controls, such as dropdown menus, buttons, or text boxes to enable the user to enter database names and/or field names to identify database index 28 and/or fields for the search result joiner 26 to join. In some embodiments, the user interface may enable entry of multiple databases 24, for which respective database indexes 28 may be entered to enable joining search results of those respective database indexes 28. While the disclosed embodiments provide selection of the database indexes 28, fields, and/or field values for the purposes of joining fields from different database indexes 28, in some embodiments, the database indexes 28, fields, and/or field values may be selected by the processor 16 and the search result joiner 26 may generate the joined dataset automatically (e.g., to run periodic reports on the data stored in the database 24) without user initiation or intervention. The user device 32 may include any suitable electronic computing device, such as a server, computer, laptop, personal computer, mobile device, smartphone, tablet, wearable device, and so on. The user device 32 may be communicatively coupled to the computing device 12 via any suitable communication network or networks, including a mobile communication network, a Wi-Fi network, local area network (LAN), wide area network (WAN), and/or the Internet.

The user interface application 30 may also display information stored in the joined dataset generated by the search result joiner 26 on the user interface provided on the user device 32. In some embodiments, the user interface application 30 may display any other information that may be relevant to the information displayed from the joined dataset, such as graphical visualizations of the information (e.g., bar graphs, pie charts, plots), associated metrics, suggested actions based on the information displayed from the joined dataset, and so forth. As an example, the user interface application 30 may be based on or use the Kibana functionality implemented via plug-in modules in the ElasticSearch platform.

Figure 2:
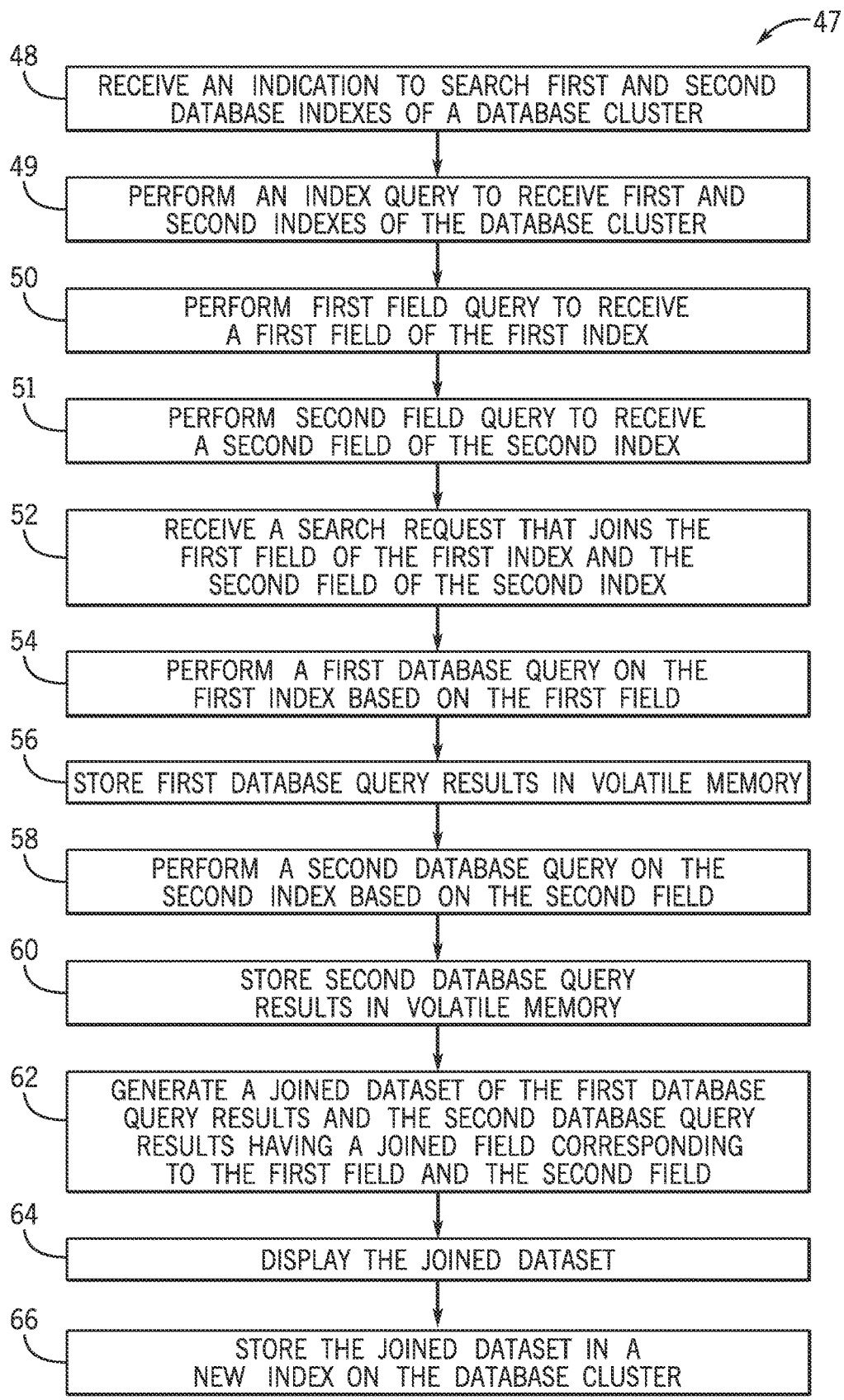
FIG. 2 is a flowchart illustrating a process for joining non-relational database query results across multiple database indexes, according to embodiments of the present disclosure.

With the foregoing in mind, FIG. 2 is a flowchart illustrating a process 47 for joining non-relational database query results across multiple database indexes 28, according to embodiments of the present disclosure. The process 47 may be performed by any suitable device that may control components of the database system 10 of FIG. 1, such as the computing device 12, the control system 14, the processor 16, the database interface 22, the search result joiner 26, and/or the user interface application 30. While the process 47 is described using steps in a specific sequence, it should be understood that the present disclosure contemplates that the described steps may be performed in different sequences than the sequence illustrated, and certain described steps may be skipped or not performed altogether. In some embodiments, the process 47 may be implemented by executing instructions stored in a tangible, non-transitory, computer-readable medium, such as the volatile memory 18 and/or the non-volatile memory 20, using a processor, such as the processor 16.

As illustrated, in process block 48, the processor 16 receives an indication that a search request is to be performed on a first database index (e.g., 28A) and a second database index (e.g., 28B) of a database cluster (e.g., 24). The indication may include selection of a search page via the user interface application 30 associated with the database indexes 28, selection of the database indexes 28 within a dropdown menu via the user interface application 30 that provides source options to perform the search on, and so on.

In process block 49, the processor 16 performs an index query to receive a first index (e.g., 28A) and a second index (e.g., 28B) of the database cluster 24. In some embodiments, performing the index query may return all indexes 28 of the database cluster 24, based on the parameters of the index query.

In process block 50, the processor 16 performs a first field query to receive a first field of the first index 28A. In some embodiments, performing the first field query may return all fields of the first index 28A. Similarly, in process block 51, the processor 16 performs a second field query to receive a second field of the second index 28B. In some embodiments, performing the second field query may return all fields of the second index 28B.

Figure 3:
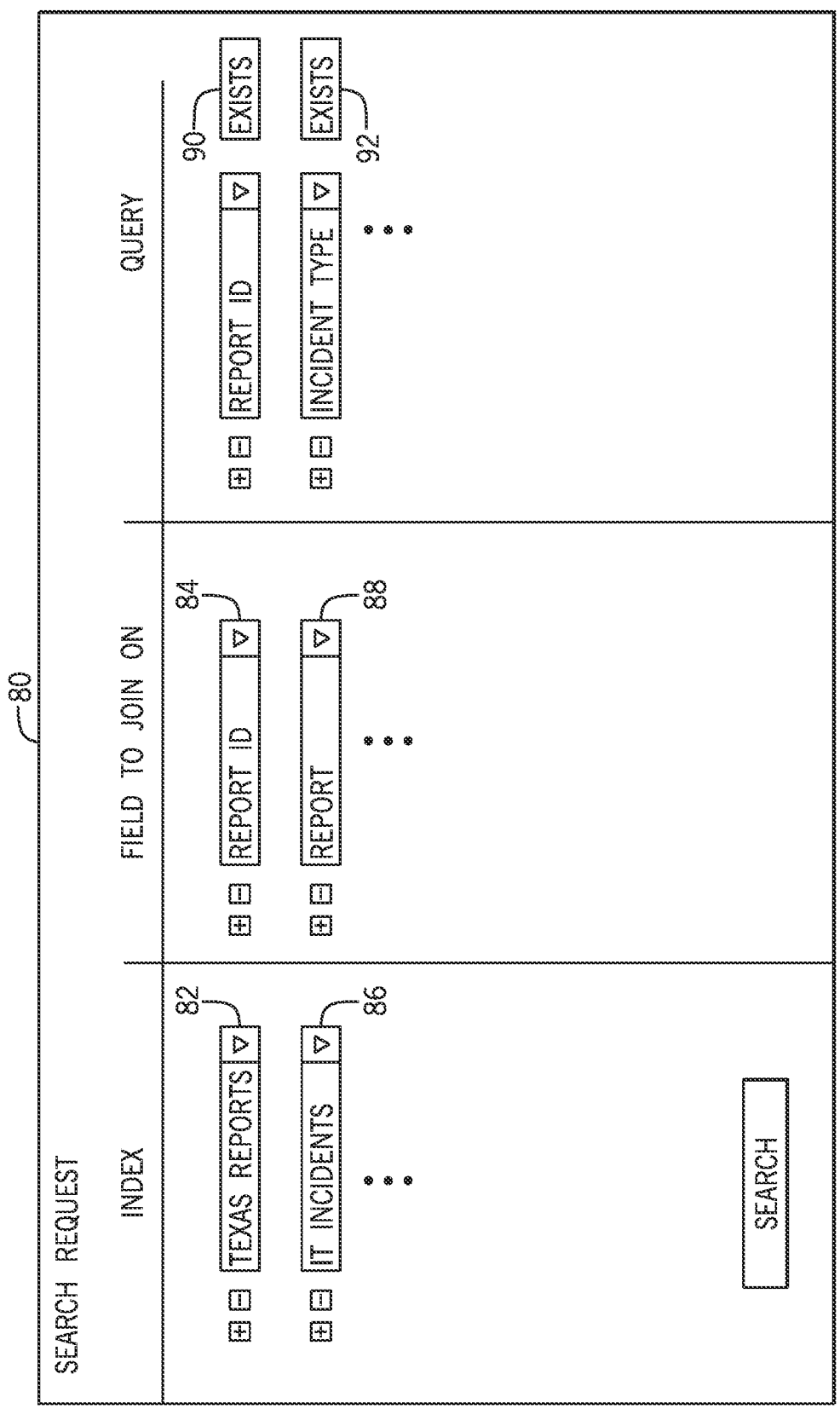
FIG. 3 is an example user interface that may be provided on an electronic display by a user interface application of the database system of FIG. 1 to enable entry of a search request, according to embodiments of the present disclosure.

In process block 52, the processor 16 receives a search request that joins the first field and the second field. In some embodiments, the database cluster 24, the first field, and/or the second field may be selected or entered by a user via the user interface application 30. FIG. 3 is an example user interface 80 that may be provided on an electronic display by the user interface application 30 to enable entry of a search request, according to embodiments of the present disclosure. The user interface 80 includes a user interface control (e.g., a dropdown menu 82) that enables identification of a first database index 28A ("Texas Reports") of a database cluster 24 and a user interface control (e.g., a dropdown menu 84) that enables identification of a first field ("Report ID") of the first database index 28A selected in the dropdown menu 82 to be joined. The user interface 80 also includes a user interface control (e.g., a dropdown menu 86) that enables identification of a second database index 28B ("IT Incidents") of the database cluster 24 and a user interface control (e.g., a dropdown menu 88) that enables identification of a second field ("Report") of the second database index 28B selected in the dropdown menu 86 to be joined. As illustrated, the fields to be joined may not have the same name.

The user interface 80 may also enable entry of field values of the first field and the second field for filtering the number of returned query results from the database indexes 28A, 28B (e.g., to save on processing and/or storage costs). In particular, a user interface control (e.g., a textbox 90) enables matching a characteristic of a first field value ("exists") of a first field ("Report ID") of the first database index 28A, and a user interface control (e.g., a textbox 92) enables matching characteristic of a second field value ("exists") of a second field ("Incident Type") of the second database index 28B. The processor 16 may join those search results (e.g., and include in the joined dataset) that include field values that meet the criteria selected in these user interface controls.

While the example user interface 80 illustrates selecting two joined fields, where each joined field is a result of joining two fields of two database indexes 28, it should be understood that the user interface 80 may enable selection of any suitable number (e.g., between two and one million) of joined fields resulting from joining any suitable number (e.g., between two and one million) of fields of any suitable number (e.g., between two and one million) of database indexes 28. Moreover, the illustrated database indexes, fields, and field values are provided as illustrative examples, and any suitable types of databases, database indexes, fields, and field values are contemplated. For example, the fields may be associated with departments, geographical locations, organizational structures, categories, date ranges, time ranges, frequency ranges, intensity levels, population counts, and so on.

Turning back to FIG. 2, in process block 54, the processor 16 causes the database interface 22 to perform a first database query on the first database index 28A based on the first field. Using the example provided in FIG. 3 with respect to the first database index 28A ("Texas Reports"), the database interface 22 queries the first database index 28A (as selected by the dropdown menu 82) for records that have a field value that exists (e.g. corresponding to the first field value "exists" as entered in the textbox 90) in the first field ("Report ID") (as selected by the dropdown menu 84). In the case where the field value is not selected, the query may request all records of the database index 28A (e.g., regardless of field value).

In process block 56, the processor 16 stores the first database query results in volatile memory 18. In this manner, use of the non-volatile memory 20, and overall memory of the computing device 12, may be reduced or minimized.

In process block 58, the processor 16 causes the database interface 22 to perform a second database query on the second database index 28B based on the second field. Using the example provided in FIG. 3 with respect to the second database index 28B ("IT Incidents"), the database interface 22 queries the second database index 28B (as selected by the dropdown menu 86) for records that have a field value that exists (e.g. corresponding to the second field value "exists"

as entered in the textbox 92) in the second field ("Report") (as selected by the dropdown menu 88).

In process block 60, the processor 16 stores the second database query results in volatile memory 18. Again, use of the non-volatile memory 20, and overall memory of the computing device 12, may be reduced or minimized.

Figure 4:
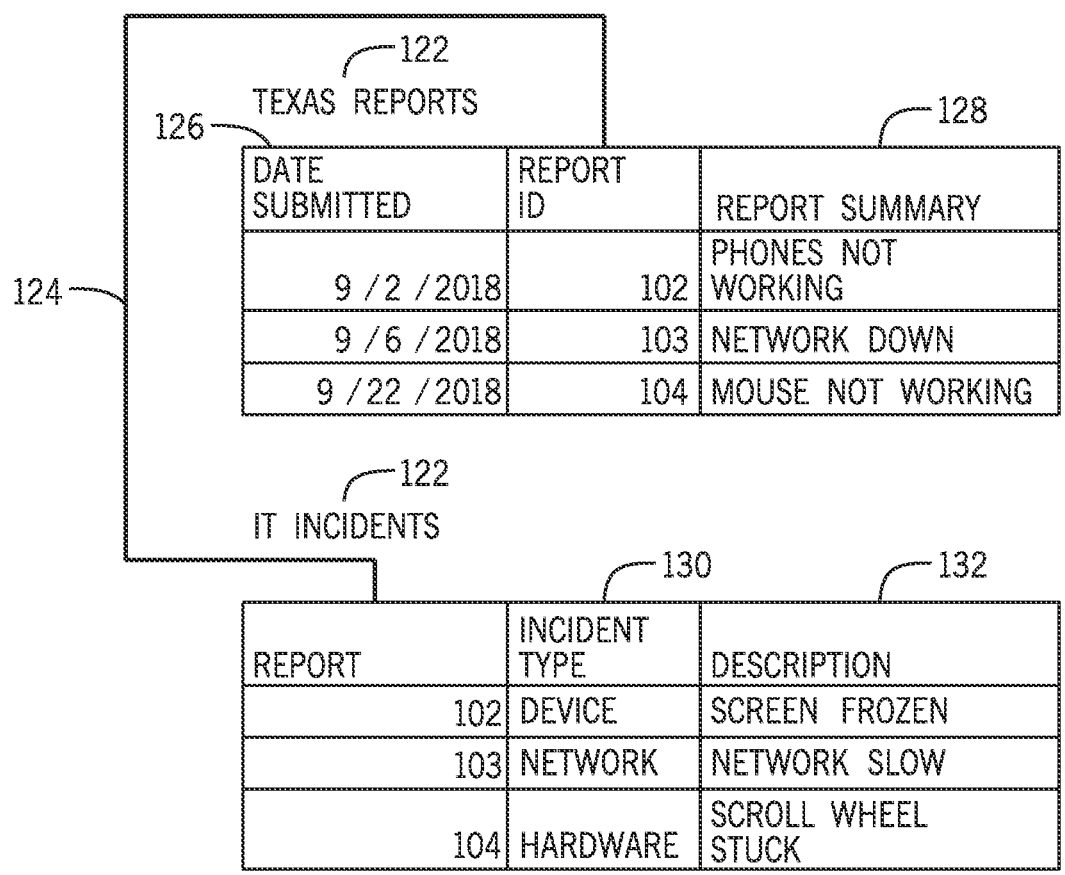
FIG. 4 is a diagram of example non-relational database query results to be joined, according to embodiments of the present disclosure.

In process block 62, the processor 16 causes the search result joiner 26 to generate a joined dataset of the first database query results and the second database query results having a joined field corresponding to the first field and the second field. FIG. 4 is a diagram of example database query results 120, 122 to be joined, according to embodiments of the present disclosure. First database query results 120 are returned as a result from performing the query on database the first database index 28A ("Texas Reports"). Second database query results 122 are returned as a result from performing the query on the second database index 28B ("IT Incidents"). Based on the identification of fields to be joined as selected by the dropdown menus 84, 88 of FIG. 3, the search result joiner 26 may join the "Report ID" field of the first database query results 120 with the "Report" field of the second database query results 122, as indicated by line 124. Moreover, the search result joiner 26 may include, in the joined dataset, other fields of the first database query results 120 and the second database query results 122, such as the "Date Submitted" field 126, the "Report Summary" field 128, the "Incident Type" field 130, and the "Description" field 132.

FIG. 5 is an example joined dataset 150 resulting from joining the database query results 120, 122 of FIG. 4, according to embodiments of the present disclosure. In particular, the processor 16 generates a joined field 152 ("Joined Field") based on joining the "Report ID" field of the first database query results 120 with the "Report" field of the second database query results 122. In some embodiments, the processor 16 may convert one or both of the fields to be joined such that the fields may be in the same format for joining. For example, the formats of the fields to be joined may be in different date formats (e.g., MM/DD/YYYY and YYYYMMDD, and the processor 16 may convert the field values into the same format. It is contemplated that the search result joiner 26 may perform any suitable data conversion to join fields of different database clusters 24, including number-based (e.g., fractional, decimal, or hexadecimal) conversion, time conversions, alphanumeric conversions, language translations, measurement unit conversions, and so on. When a filter is used, as illustrated by the text boxes 90, 92 in FIG. 3, the processor 16 may generate the joined dataset 150 from data that meets the filtered criteria. As such, the joined dataset 150 includes entries that have existing values for the "Report ID" field and existing values for the "Incident Type" field 130. The processor 16 may also display other fields of the first database query results 120 and the second database query results 122, such as the "Date Submitted" field 126, the "Report Summary" field 128, the "Incident Type" field 130, and the "Description" field 132.

Turning back to FIG. 2, in process block 64, the processor 16 causes the user application the user interface application 30 to display the joined dataset. For example, the user interface application 30 may display the joined dataset 150 of FIG. 5 on the electronic display of the user device 32. The processor 16, in process block 66, also stores the joined dataset in a new index on the database cluster 24, though the joined dataset is contemplated to be stored on any suitable medium. In this manner, the process 47 may efficiently join non-relational database query results across multiple database indexes 28 based on fields having different names, while reducing or minimizing non-volatile and overall memory usage.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a non-relational database cluster comprising a plurality of non-relational databases;
a plurality of database indexes stored in the non-relational database cluster, wherein each database index of the plurality of database indexes comprises multiple types of documents having a plurality of fields and wherein said each database index of the plurality of database indexes is different from another database index; and
a computing device comprising: a processor and a volatile memory, wherein the volatile memory comprises processor-executable instructions configured to cause the processor to:
perform a plurality of index queries on the plurality of database indexes to receive the plurality of database indexes;
perform a plurality of field queries to receive a plurality of field lists based on the plurality of database indexes, wherein each list of the plurality of field lists corresponds to a list of a respective plurality of fields associated with a database index of the plurality of database indexes;
receive a selection of fields from the plurality of field lists, wherein each field of the selection of fields is from a different list of the plurality of field lists;
perform a plurality of search queries on the plurality of database indexes based on the selection of fields to generate a plurality of search results, wherein the plurality of search results comprises records retrieved from the plurality of non-relational databases;
convert one or more datasets contained within the selection of fields to a same data type; and
join the plurality of search results into a joined dataset by associating each field from the selection of fields with another field, wherein the joined dataset comprises a joined field corresponding to a first field and a second field and comprises records having the same data type.

2. The system of claim 1, wherein the selection of fields comprises at least three fields.

3. The system of claim 1, wherein each field from the selection of fields is associated with a respective type of document, wherein each respective type of document is different from another type.

4. The system of claim 1, wherein the processor-executable instructions are configured to cause the processor to generate the joined dataset based on a search result joiner that joins each search result of the plurality of search results with another type.

5. The system of claim 1, comprising a user device having an electronic display, wherein the user device comprises a user interface application configured to display information stored in the joined dataset on the electronic display.

6. The system of claim 5, wherein the user interface application comprises one or more user interface controls, wherein the one or more user interface controls are configured to enable associating each field of the plurality of fields selected with another type.

7. The system of claim 1, wherein each index of the database indexes is different from another type.

8. The system of claim 1, wherein the processor-executable instructions are configured to cause the processor to store the plurality of search results in the volatile memory.

9. The system of claim 1, comprising non-volatile memory, wherein the processor-executable instructions are configured to cause the processor to store the joined dataset in the non-volatile memory.

10. The system of claim 9, wherein the non-volatile memory comprises read-only memory.

11. The system of claim 1, wherein the processor-executable instructions are configured to overwrite a previously generated joined dataset with the joined dataset.

12. A computing device comprising:
a processor; and a volatile memory storing processor-executable instructions configured to cause the processor to:
perform, a plurality of index queries to receive a plurality of database indexes stored in a non-relational database cluster comprising a plurality of non-relational databases, wherein each database index of the plurality of database indexes comprises a set of documents having a plurality of fields, and wherein said each database index of the plurality of database indexes is different from another database index;
perform a plurality of field queries to receive a plurality of field lists based on the plurality of database indexes, wherein each list of the plurality of field lists corresponds to a list of a respective plurality of fields associated with a database index of the plurality of database indexes;
receive a selection of fields from the plurality of field lists, wherein each field of the selection of fields is from a different list of the plurality of field lists;
perform a plurality of search queries on the plurality of database indexes based on the selection of fields to generate a plurality of search results, wherein the plurality of search results comprises records retrieved from the plurality of non-relational databases;
convert one or more datasets contained within the selection of fields to a same data type; and
join the plurality of search results into a joined dataset by associating each field from the selection of fields with another field, wherein the joined dataset comprises a joined field corresponding to a first field and a second field and comprises records having the same data type.

13. The computing device of claim 12, wherein the selection of fields comprises at least three fields.

14. The computing device of claim 12, wherein each field of the plurality of fields associated with a respective database index of the plurality of database indexes is different from another index.

15. The computing device of claim 12, wherein the processor-executable instructions are configured to cause the processor to generate the joined dataset based on a search result joiner that joins each search result of the plurality of search results with another search result.

16. The computing device of claim 12, comprising a user device having an electronic display, wherein the user device comprises a user interface application configured to display information stored in the joined dataset.

17. The computing device of claim 12, comprising a non-volatile memory, wherein the processor-executable instructions are configured to cause the processor to: store the plurality of search results in the volatile memory; and store the joined dataset in the non-volatile memory.

18. The computing device of claim 17, wherein the non-volatile memory comprises read-only memory.

19. A method, comprising:
performing, via a processor, a plurality of index queries to receive a plurality of database indexes stored in a non-relational database cluster comprising a plurality of non-relational databases, wherein each database index of the plurality of database indexes comprises multiple types of documents having a plurality of fields, wherein said each database index of the plurality of database indexes is different from another database index, and wherein each field of the plurality of fields associated with a respective database index is different from another field;
performing, via the processor, a plurality of field queries to receive a plurality of field lists based on the plurality of database indexes, wherein each list of the plurality of field lists corresponds to a list of a respective plurality of fields associated with a database index of the plurality of database indexes;
receiving, via the processor, a selection of fields from the plurality of field lists, wherein each field selected is from a different list of the plurality of field lists;
performing, via the processor, a plurality of search queries on the plurality of database indexes based on the selection of fields to generate a plurality of search results, wherein the plurality of search results comprises records retrieved from the plurality of non-relational databases;
converting, via the processor, one or more datasets contained within the selection of fields to a same data type; and
joining, via the processor, the plurality of search results into a joined dataset by associating each field from the selection of fields with another field, wherein the joined dataset comprises a joined field corresponding to a first field and a second field and comprises records having the same data type.

20. The method of claim 19, wherein receiving the selection of fields comprises selecting at least three fields.

* * * * *